INVENTORS
John I. Ewing
Roger E. Zaunere

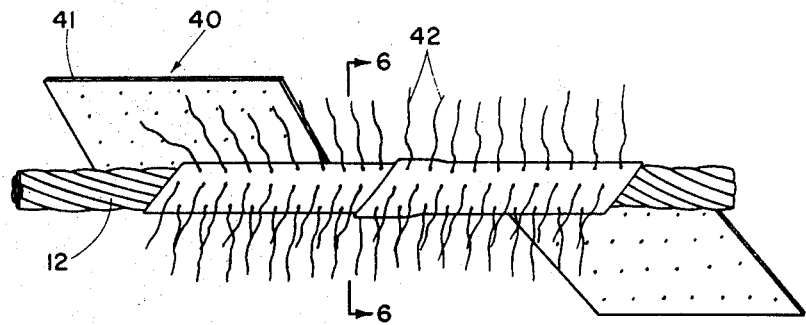
Fig. 4
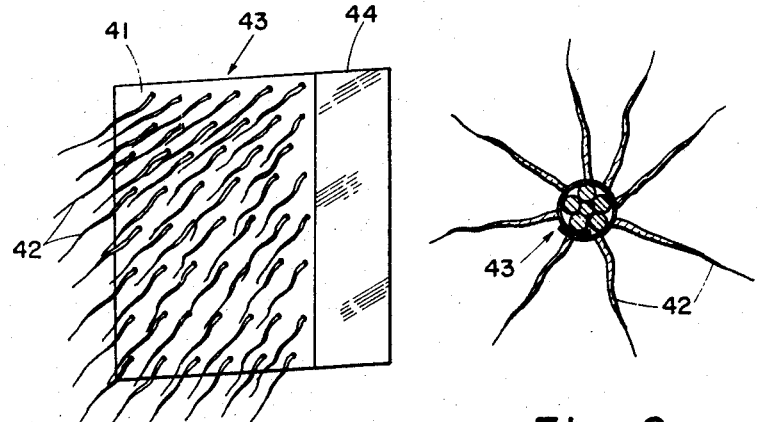
Fig. 5
Fig. 6

United States Patent Office 3,472,196
Patented Oct. 14, 1969

3,472,196
FAIRINGS FOR UNDERWATER CABLES, TOW-
LINES AND STRUCTURAL MEMBERS
John I. Ewing, Palisades, and Roger L. Zaunere, West
Nyack, N.Y., assignors, by mesne assignments, to the
United States of America as represented by the Secretary of the Navy
Filed Jan. 17, 1968, Ser. No. 698,651
Int. Cl. B63b 21/10
U.S. Cl. 114—235                            10 Claims

ABSTRACT OF THE DISCLOSURE

A simplified fairing is provided which is made of heat shrinkable plastic applied at ambient temperature over the cable, hose or other line and thereafter heated to firmly enclose the supporting member. Fins, which may be single, double, quadruple, etc., or long filaments are attached to the body portion of the fairing and stream in the environment thereby reducing hydrodynamic drag. A ribbon form may be wound around the supporting member and may have filaments secured thereto. A tough, flexible material such as Teflon or a Teflon based material is suggested for use in the invention.

---

The invention described herein may be manufactured and used by or for the Government of the United States of America for governmental purposes without the payment of any royalties thereon or therefor.

This invention relates generally to drag reducing coverings for marine towlines of the type used to tow submerged objects, and more particularly to towline assemblies of simplified construction wherein the fairing member may be easily secured to the towline and the assembly easily stowed.

In marine towing of oceanographic equipment, particularly with respect to sensitive hydrophones and the like, fairing members have been suggested to reduce hydrodynamic drag on cables, hoses and types of lines for both towing and mooring applications. These fairing members commonly are made of plastics, metals and filaments. Considerable difficulty has been encountered, however, in past efforts to eliminate or or substantially reduce vibrations of the towing line by such members. Generally, the fairings used to eliminate or reduce such vibrations are formed in sections which are clamped or otherwise applied to the towline, or the towline is shaped in a cross-sectional area which permits easier passage through the water. Some fairings are inserted within the towline or cable during manufacture. In others, the towline is formed in individual links, each of which is shaped to promote easier passage through the water. These prior methods have been only partially successful in eliminating the vibration and often have caused difficulties such as kiting out to one side when the towline is deployed or impeding hauling in of the cable by capstan and stowing it on a storage drum or in a conventional hawser locker.

Some of the prior art devices can only be coiled about a storage drum in one layer because of their bulk and the possibility of the fairings interfering with one another during the reeling and unreeling processes. Special handling equipment therefore is required such as unusually large drums where the cable or towline is intended to reach shallow depths. Damage may result to the prior fairings during the reeling operation and for this reason it is often necessary to remove the fairings before the cable can be reeled thereby enlarging the effort required to pay out and haul in the cable. This aspect is further magnified where it is necessary to haul in cables which include accompanying hydraulic automatic lines.

The present invention avoids many if not all of the difficulties associated with existing fairings for underwater towlines such as cables, hoses, wires and the like by providing a shrinkable fairing which may be applied on board ship and which requires merely the application of a minimum amount of heat to secure the fairing to a towline or other object. One embodiment of the present invention comprises a heat shrinkable fairing having a hollow main body portion through which the cable passes and an elongate fin which extends into the environment a distance considerably greater than the diameter of the towline. The fin may be slotted to give additional flexibility and allow for easy handling and storage. Multiple fins may be used in lieu of a single fin. Another embodiment comprises a shrinkable tape which is wound around the towline and may be heated as the wrapped towline is paid out, the tape having secured to it a multiplicity of elongate filaments which serve as streamers to reduce hydrodynamic drag.

Accordingly, it is an object of the present invention to provide a fairing means which is easily passed over and secured to a towline or other object.

Another object of the invention is to provide a fairing structure which may be easily stowed with the object to which it is secured.

A further object of the invention is to provide a fairing means for towlines or other objects which is inexpensive and protective and is easily applied preferably on board ship.

Other objects, advantages and novel features of the invention will become apparent from the following detailed description thereof when considered in conjunction with the accompanying drawings in which like numerals represent like parts throughout and wherein:

FIG. 4 is an isometric view of an alternate environment of the invention wherein a ribbon of material is wrapped about a towline;

FIG. 5 is another embodiment of ribbin material in which a portion is reserved for overlapping; and FIG. 6 is a sectional view of the embodiment of FIG. 4 taken along a line substantially corresponding to line 6—6 in FIG. 4.

Figure 1:
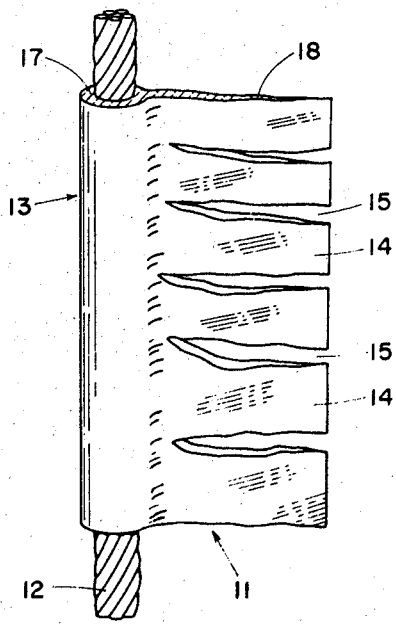
FIG. 1 is a perspective view of one embodiment of the fairing of the present invention assembled over a towline.

Referring to FIG. 1, a faired connecting line assembly 11 is shown comprising a towline or anchor line means 12 and a fairing 13 which is secured about towline 12. The streaming portion 14 of fairing 13 is divided into a plurality of streamer sections by a plurality of slots 15. Fairing 13 preferably has a thickened towline receiving portion as indicated at 17 which preferably completely encloses towline 12 while streaming portion 14 preferably is tapered as indicated at 18 from a substantial thickness adjacent towline 12 to a fine dimension at the end remote from the towline.

Figures 2A, 2B:
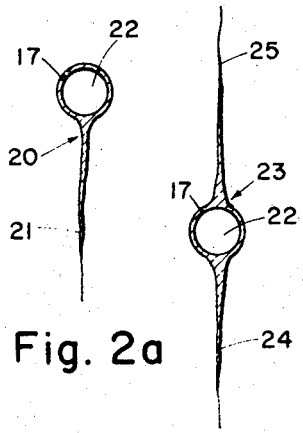
FIG. 2a is a sectional view of the embodiment of FIG. 1.
FIG. 2b is a sectional view of the form of the invention in FIG. 1 having oppositely positioned fins.

FIG. 2a is a sectional view of an unslotted fin fairing 20 having an opening 22 for a towline and a single fin 21. A dual fin embodiment 23 as shown in FIG. 2b preferably has fins 24 and 25 substantially equal in length and thickness and symmetrically disposed about the opening 22.

Figure 2C:
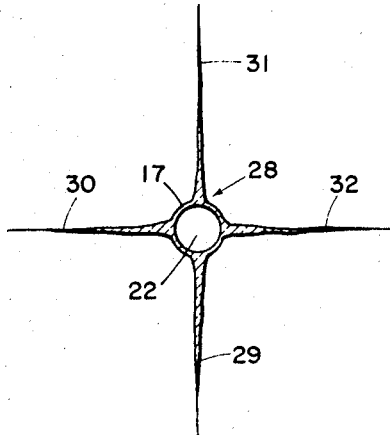
FIG. 2c is a sectional view of the form of invention in FIG. 1 having a plurality of fins.

In FIG. 2c, a quadruple fin embodiment 28 is shown having fins 29–32 formed symmetrically about the opening 22.

Figure 2D:
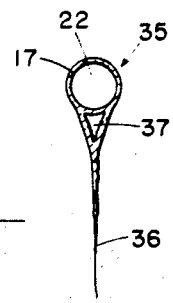
FIG. 2d is a sectional view of the embodiment of FIG. 1 wherein a void is formed between the towline opening and the fin.

In FIG. 2d, an alternate single fin embodiment 35 is shown having a void 37 interposed between the towline opening 22 and fin 36.

Figure 3:
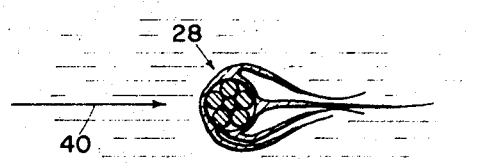
FIG. 3 illustrates the operation of the embodiment shown in FIG. 2c in a liquid environment.

In FIG. 3, the embodiment of FIG. 2c is shown as it would appear in motion in a fluid environment, the fins streaming aft from both the front and side of the towline to a point of substantial contact with the fin streaming directly aft from the towline.

An alternate form of the invention is shown in FIG. 4 wherein a composite fairing assembly 40 comprises a tape or ribbon 41 having a multiplicity of filaments 42 secured to or molded on one side thereof. The ribbon embodiment of FIG. 4 is shown as it is applied to the towline before heating. The multiplicity of filaments in a representative length of wrapped towline extend randomly in all directions outward from the towline providing similar drag reducing at any towline attitude.

In FIG. 5, a fairing assembly 43 similar to assembly 40 of FIG. 4 is shown with an overlap portion 44 having no filaments on either side so that fairing assembly 43 may be applied without overlapping the filaments of adjacent wraps. FIG. 6 shows the embodiment of FIG. 5 in cross section as it would appear after having been wrapped about a towline.

The fairings of the present invention preferably are made of a heat shrinkable plastic which may be a Teflon based material which would provide the desired flexibility, toughness, etc. for the intended applications. These fairings provide a tough, flexible and tightly adhering plastic covering having a hydrodynamically clean shape for towlines, anchor lines and the like. They provide for both drag reduction as well as protection of a towline or anchor line from corrosion, scaling, erosion by electrolysis, etc. When deployed, the fairings serve to reduce drag by breaking down friction and other sources of drag about the surface of towlines or anchor lines. In regard to the embodiments of FIGS. 2b, 2c, 4 and 5, the streaming portions of the fairing extend in a number of directions from dual in FIG. 2b to omnidirectional in FIGS. 4 and 5 so that when a towline moves through the environment or when an anchor line is extended in a constant current or tidal current, the drag reducing effect is applicable to several directions of relative motion between the environment and the towline or anchor line. Particularly with regard to the environments of FIGS. 2c, 4 and 5, the virtually omnidirectional feature provides drag reduction at various attitudes caused by lateral motion of and change of tension in anchor line.

The present fairings may be applied to stationary structures such as ocean platform support members, pilings, etc., as well as to lines which have some freedom of motion in the environment. On stationary structural support members, the fairings of the present invention would serve to reduce the wave force and current force applied by the environment against the members in addition to providing surface protection.

A further feature of the present fairings is that they may be applied readily at the point of deployment to a towline or cable or other object. In the case of the tubular embodiments having towline enclosing portion 17, preferably the fairing would be slipped over the object to be faired and then heat would be applied either by hand, hot air blower or other means. In perhaps the most conventional use, i.e. on towlines, the fairing would be slipped over the end of the towline to which a towed object is to be secured, there having first been made such allowance in the construction of the fairing that the inner diameter of the enclosing portion is significantly greater than the outer diameter of the towline.

After insertion of the towline into the fairing, heat is applied by suitable conventional means such as a hot air blower to shrink the fairing about the towline securely before the composite faired towline assembly enters the liquid environment. With regard to the embodiments of FIGS. 4 and 5, these may be wrapped about the towline as it is paid out after which heat is applied so that the fairing is secured to the towline by shrinking before the faired towline assembly enters the liquid environment. In the embodiment of FIG. 4, there necessarily would be some filaments of one layer wrapped within the succeeding layer of the ribbon material. However, in the embodiment of FIG. 5, this is avoided by the addition of overlapping strip 44.

There is thus provided a novel towline or anchor line fairing which is inexpensive, easy to apply and positively secured to a cable or towline or other object by the application of minimum heat. The fairing may be a single fin as shown in FIG. 2a or multiple fins as shown in FIGS. 2b, 2c and 2d, and each fin may or may not be slotted as shown in FIG. 1. In the embodiments of multiple fins, of course, some may be slotted while others may remain continuous. The embodiment of FIG. 2d provides a cavity adjacent the cable receiving section to reduce stiffness and promote ease of movement of the fin where lateral movement occurs in the towline. Any of the embodiments may be made by modern extrusion processes. The embodiments, of course, may be applied to a cable or towline at the conclusion of the manufacturing process thereby avoiding the application on board ship.

Obviously many modifications and variations of the present invention are possible in the light of the above teachings.

What is claimed is:

1. A fairing for reducing drag on towline means such as cables, hoses and fibrous towlines when used in underwater towing and mooring applications comprising:
   a shrinkable covering adapted to be applied at ambient temperature over said towline means;
   said covering including a main body portion which substantially surrounds said towline means and an appendage portion which is adapted for streaming in the environment;
   said main body portion when subjected to an appreciable increase in temperature conforming firmly to said towline means and maintaining said firm conformation thereafter during use in the environment.

2. The fairing as defined in claim 1 wherein said covering is made of a plastic material which when heated moderately contracts toward and firmly conforms to the periphery of said towline means.

3. The fairing as defined in claim 2 wherein said main body portion includes a towline means receiving opening larger in cross section than the areas of a cross section of the towline means so that said fairing when at ambient temperature may be readily slipped over the towline means.

4. The fairing as defined in claim 3 wherein said appendage portion includes at least one continuous fin;
   said fin normally deployed so as to extend in the direction of motion of said towline means when under tow.

5. The fairing as defined in claim 4 and further including a void disposed intermediate said fin and said towline means receiving opening for reducing the stiffness of said fairing.

6. The fairing as defined in claim 5 wherein said appendage portion is divided into a multiplicity of streaming sections by slots in said fin.

7. The fairing as defined in claim 5 wherein said appendage portion includes a plurality of fins spaced about the periphery of said main body portion;
 said fins adapted to stream to either side of said towline means in the direction of towing.

8. The fairing as defined in claim 2 wherein said main body portion is in the form of ribbon means adapted to enclose said towline means by being wound therearound with each turn of said winding overlapping the previous turn.

9. The fairing as defined in claim 8 wherein said appendage portion includes a plurality of filament means affixed to the side thereof remote from said towline means.

10. The fairing as defined in claim 9 wherein said ribbon means includes a tape of plastic material having an overlapping strip along one edge devoid of said filament means so that the tape when wound about said towline means may not overlap any of said filaments; said filament means extending in a multiplicity of directions from said towline means so as to provide omnidirectional drag reduction.

References Cited

UNITED STATES PATENTS 3,368,514   2/1968   Kelly _____ 114—235

OTHER REFERENCES

Undersea Technology Publication, July 1964, p. 34 relied on.

TRYGVE M. BLIX, Primary Examiner

U.S. Cl. X.R.

156—85